United States Patent [19]

Pressprich

[11] Patent Number: 5,012,404
[45] Date of Patent: Apr. 30, 1991

[54] INTEGRATED CIRCUIT REMOTE TERMINAL STORES INTERFACE FOR COMMUNICATION BETWEEN CPU AND SERIAL BUS

[75] Inventor: John W. Pressprich, Woodland Park, Colo.

[73] Assignee: United Technologies Corporation, Hartford, Conn.

[21] Appl. No.: 263,748

[22] Filed: Oct. 28, 1988

[51] Int. Cl.$^5$ .................. G06F 13/00; G06F 13/14; G06F 13/16; G06F 13/36
[52] U.S. Cl. ..................... 364/200; 364/238.3; 364/238.4; 364/238.6; 364/240.2; 364/238; 364/240.5; 364/245.5; 364/246; 364/251.4; 364/260; 364/265; 364/265.1; 364/265.3
[58] Field of Search .............. 364/200, 900, 424.01, 364/424.1, 424.05

[56] References Cited

U.S. PATENT DOCUMENTS

| | | | |
|---|---|---|---|
| 4,322,793 | 3/1982 | Andersson et al. | 364/200 |
| 4,328,543 | 5/1982 | Brickman et al. | 364/200 |
| 4,623,997 | 11/1986 | Tulpule | 370/85 |
| 4,625,307 | 11/1986 | Tulpule et al. | 370/85 |
| 4,635,253 | 1/1987 | Urui et al. | 370/67 |
| 4,672,570 | 6/1987 | Benken | 364/900 |
| 4,680,698 | 7/1987 | Edwards et al. | 364/200 |
| 4,695,592 | 9/1987 | Howland | 364/200 |
| 4,805,137 | 2/1989 | Grant et al. | 364/900 |
| 4,853,850 | 8/1989 | Krass, Jr. et al. | 364/200 |

Primary Examiner—Thomas C. Lee
Assistant Examiner—George C. Pappas

[57] ABSTRACT

A simplified bus interface circuit for stores applications includes on-chip pseudo-dual port memory that is user-configurable into receive and transmit portions that are further separable into blocks associated with various sets of commands by means of a pointer set of assignable pointers. The circuit provides for echo-back comparison of transmissions and confirmation, in the case of RT to RT commands that the correct terminal has initiated a message.

10 Claims, 4 Drawing Sheets

INTEGRATED CIRCUIT REMOTE TERMINAL STORES INTERFACE FOR COMMUNICATION BETWEEN CPU AND SERIAL BUS

BACKGROUND OF THE INVENTION

1. Field of the Invention

The invention relates to a remote terminal interface to a system bus that is adapted to be used in an aircraft stores item, in which small chip-size and low cost are important.

2. Description of the Related Art

In an aircraft in the MIL-STD 1553 context, there is a governmental specification for the functions to be performed by the bus controller and the interface logical units on the remote terminals. One example of a bus interface satisfying the requirements is the remote terminal interface described in U.S. Pat. Nos. 4,625,307; 4,635,253; 4,695,952; and 4,623,997. This prior work was directed at permanent remote terminals that would remain part of the aircraft. In the particular case of an aircraft store, meaning any of a number of devices that are attached to the aircraft with lugs and meant to be dropped or expended in flight, primary considerations are that the chip be small, use low power and be inexpensive, since it typically will only be used once and then discarded. The chip must, of course, perform the functions required of a remote terminal interface but will probably do so in a simpler manner. It has been the case in the prior art that the cost of the electronics required to construct the interface could by itself cost more than the total price of the stores connected to it. The industry has thus felt the need for a low cost, low power interface.

SUMMARY OF INVENTION

The invention relates to a single integrated circuit which performs the functions of the 1760 A specification which is related to the 1553 specification. The MIL-STD 1760A augments MIL-STD 1553 by (1) defining a specific stores message format; (2) defining a method of performing mass data transfers; and (3) assigning specific definitions such as time, frequency, distance, and velocity, to normally undefined 1553 data words.

An integrated circuit constructed according to the invention comprises a dual redundant MIL-STD 1553 interface containing 1K×16 of user configurable static RAM and all encoding/decoding logic error detection and additional circuitry to comply with the 1760A and 1553B specifications. It further includes automatic data control, memory address generation, memory control and RAM contention warning for the storage, by means of a RAM controller controlling a 1K memory that may be configured by the system designer into sections of variable length to accommodate his particular needs. The memory is divided into a 64 word section for data pointers and a 960 word section for data storage. Each of the pointers contains the address of a starting location of an area of memory where data may be stored.

Another feature of the invention is the provision of a continuous on-line wraparound test so that the device can monitor its own transmissions for errors.

A further advantage of the invention is that no additional decoding circuitry is required to meet MIL-STD 1760A since the required subaddress decoding is done internally.

Another feature of the invention is that the circuit's internal control takes care of all 1553 data transactions on or off the bus, requiring only that the host CPU not access RAM while the BUSY signal is active.

Within the chip, there is a set of data paths connected to the internal RAM, to receive data both from the 1553 bus and from the host CPU and to transmit data in both directions. There is also a path feeding back from the data output of the RAM so that a portion of an output word can be fed back in as an address.

Other features and advantages will be apparent from the specification and claims and from the accompanying drawings which illustrate an embodiment of the invention.

DESCRIPTION OF THE PREFERRED EMBODIMENT

A remote terminal interface for MIL-STD 1553 or 1760 application must necessarily have an input-output section for transforming from the specified signal levels on the bus to conventional integrated circuit levels and serial to parallel decoders for connecting the data format. It must also have command recognition logic to decode a command, a control system or a state machine to carry out the command. There must also be some form of memory address control and data transfer control to transfer data to and from the host CPU and to and from the bus and also to transfer data into the required location in memory.

Figure 1:
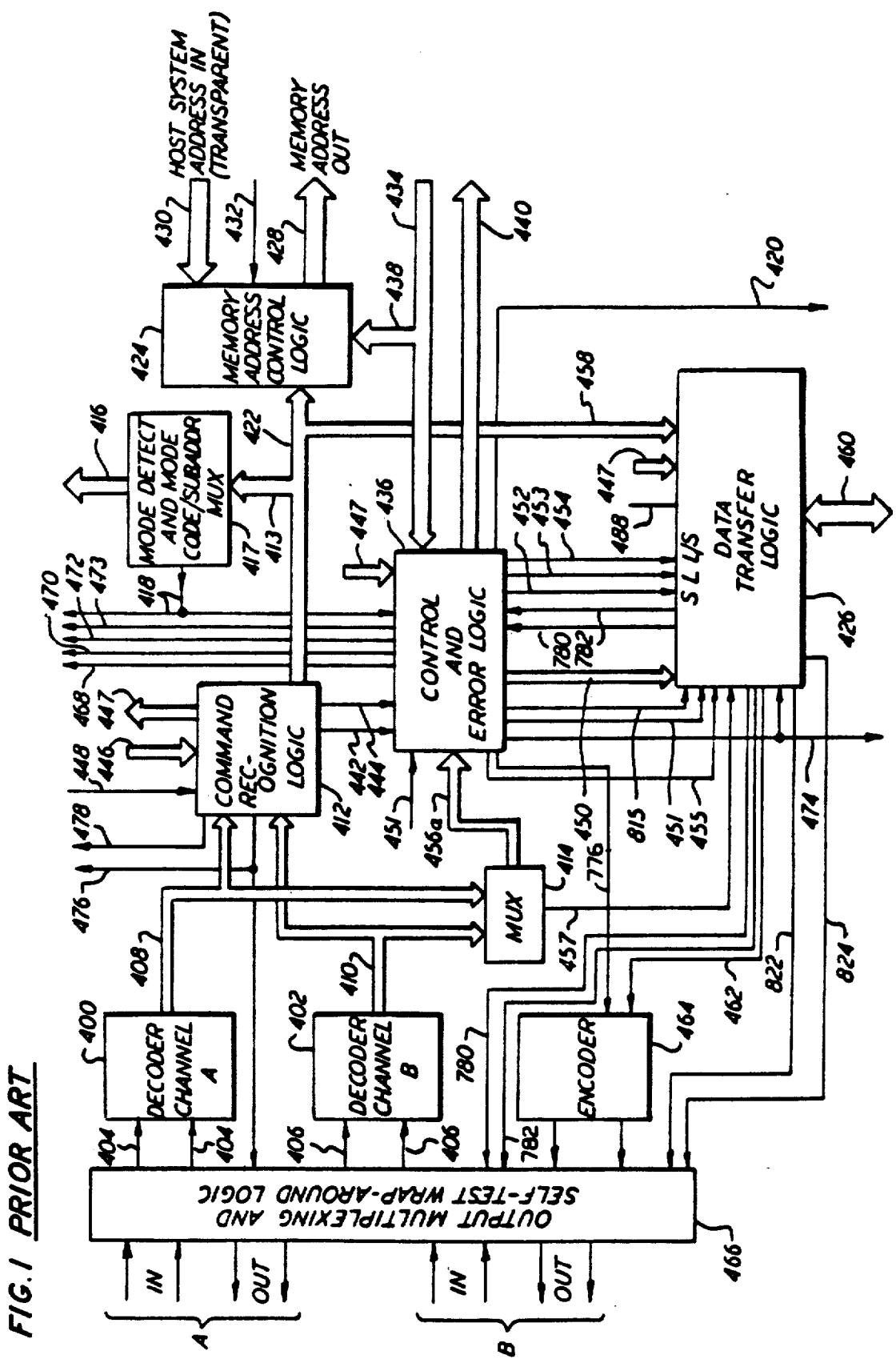
FIG. 1 is a simplified schematic of a prior art device.

FIG. 1 illustrates a diagram from a prior art device as shown in U.S. Pat. No. 4,695,952, showing a high level block diagram with blocks for carrying out these functions.

Within the requirements of the higher level blocks, however, there are many ways to carry out the functions. As was noted above, the primary consideration in a stores interface is to have an economical chip drawing low power. The effort going into designing such a chip, then, is in making decisions to carry out the required functions in an economical manner that fills the system requirements at the least total system cost.

Figure 2:
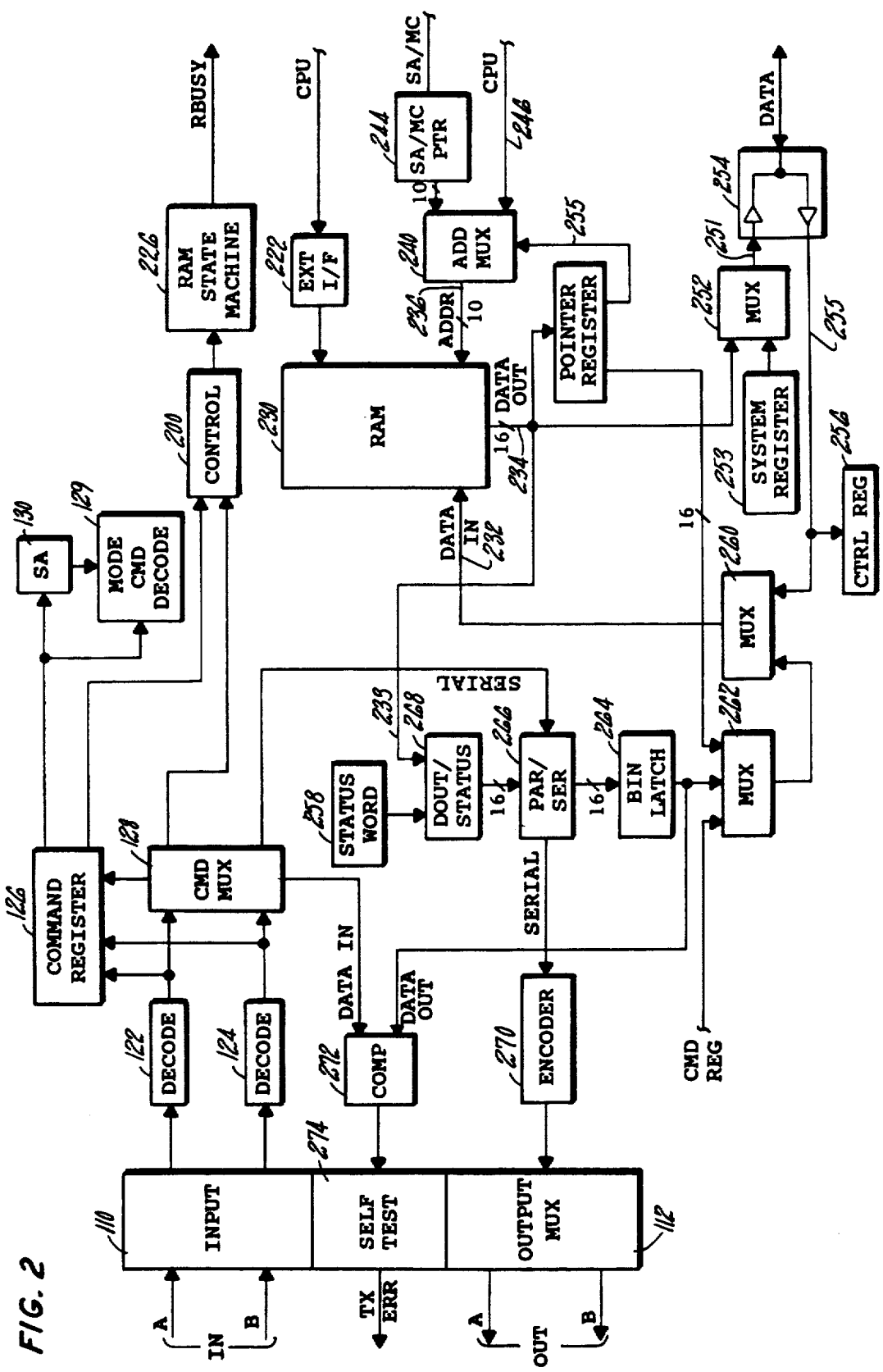
FIG. 2 is a simplified block diagram of a device constructed according to the present invention.

Referring now to FIG. 2, there is shown a block diagram of the present invention at a somewhat lower level of abstraction. On the left, there is an input section 110 and an output section 112 for connection to the 1553 bus. Transformers, referred to as output bus interface means, to connect voltage levels are off-chip and are not shown. Connected to the input section are two decoders 122 and 124 which feed into a multiplexer 128 and also into a command detection device 126. Command detection device 126, in turn, feeds two units that respectively detect a subaddress in the command word and a mode command, differing from the usual commands. The command multiplexer 128 also feeds parallel data to a control unit 200 which performs further analysis of the command to generate control signals that go to a number of units on chip. Signals from command register 126 and multiplexer 128 travel to control 200, to present to it both decoded information and the raw command. Functions of control unit 200 include: error checking, response timing, data transfer, and the generation of signals used by RAM state machine 220. Most of the control lines are suppressed in this drawing for clarity.

Another line from the command multiplexer 128 carries serial information to a register 266 which can load and emit data in parallel and also has shifting hardware for serial input and output. This unit is primarily used to feed encoder 270 which transmits data to output multiplexer 112 and through it to one of buses A or B. Part of the parallel to serial decoding required to transfer from the parallel operations of the circuit to the serial bus are performed in units 266 and 270 acting together. The data in unit 266 can also be transferred downwardly in the drawing to latch 264 where it may be stored for a predetermined amount of time and then fed through into the memory. The path for input data off the 1553 bus is: through a decoder and multiplexer 128 to register 266 in serial form, then transfer in parallel form to latch 264. With this path, incoming data may be cleared out of register 266 in order to free it up to process the next word coming off the bus. Continuing on this data-in path, data passes through multiplexer 262 to multiplexer 260, and then on line 232 into the data input port on RAM 230. Unit 266 could be set to pass data from multiplexer 268 through to latch 264, if desired, but in this embodiment it is configured to pass data from multiplexer 268 serially out to encoder 270.

As can be seen from the units discussed above, a number of sources of data may be fed into the RAM. The path just described is that of the raw input data being fed into the memory. Another route is through command register 126 which stores the command word as soon as it enters the chip, then through multiplexer 262 and multiplexer 260 into line 232 and then into the RAM. Thus, the command word and the data associated with the command word may follow two separate paths. The command word takes a different path because information contained within it, such as, the T/R bit, subaddress or mode, word count or mode code need to be retained through data word processing.

Another source of data is from the host CPU through interface 254 along internal bus 255 and through multiplexer 260 into line 232. The various multiplexers will, of course, be set according to the state of control 200, RAM state machine 226 and interface unit 222.

There is also a feedback path for data to enter RAM 230. Pointer register 238 is connected to bus 234 and thus to the memory output port. It may pass a full 16 bit word to multiplexer 262 and then into multiplexer 260 and RAM 230. Also, the lower 10 bits of the output word (the DA field) may pass from the pointer register to address multiplexer 240 and then to the address port of RAM 230.

Data may be read out to the pointer register, then a second data word may be written to the address given by the DA field in the pointer register. This is the normal pointer operation when the data taken out are the contents of a pointer memory location. Pointer register 238 also has associated with it logic for incrementing the lower 10 bits (but not carrying over to the 11th bit), used for address incrementation and also logic to decrement the upper 6 bits for the index to the number of words permitted in the block in which the pointer is active. This feature can be used in storing message blocks taken off the bus, in which the command word is stored as the first word in the block and the first data word is stored in the next memory location of (DA + 1).

Continuing, address information may come directly from the local CPU along line 246, then through address multiplexer 240 and into RAM. A second portion of the address may come from either subaddress unit 130 or mode code unit 129, both of which may be the lower 5 bits of the 10 bit address. This information enters pointer unit 244 which acts as a lookup table that translates from a subaddress or mode code carried on the 1553 bus to one of the 64 pointer addresses in the pointer section of memory. This pointer memory address then passes through address multiplexer 240 into RAM.

With this feature, the system designer may design the lookup table to associate several commands with the same area of memory, so that data associated with these commands are stored in the same buffer area. Also, where required, the designer may establish a number of separate buffer areas reserved for different 1553 commands (keyed on the command subaddresses).

Figure 3:
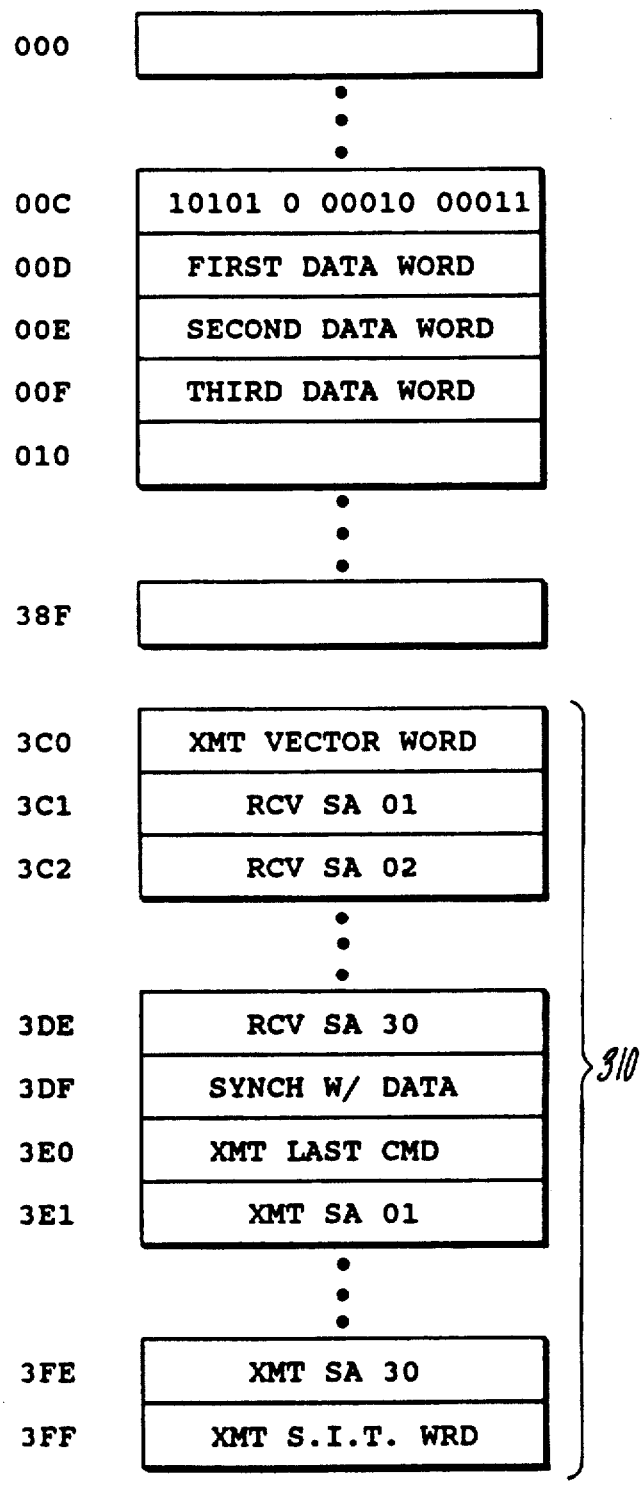
FIG. 3 is a diagram showing memory allocation in the preferred embodiment.

Contents of RAM 230 are displayed more conveniently in FIG. 3, which shows the 64 words in area 310, from address 3C0 to address 3FF, which are used as data vectors or pointers, leaving 960 words of the 1K for data storage and retrieval. Each location of the 64 word vector table contains a pointer with a 6 bit index field and 10 bit data address field. The index field defines the message buffer count, having a maximum of 64 words, while the data address pointed to is the actual address in RAM where the next data word will be stored or retrieved.

The subaddress on the 1553B command word directly maps into the five least significant bits of the pointer address. Thus, for a transmit-from-subaddress-02 command, the pointer is found in address 3E2 (hexadecimal). The sixth bit in the pointer address is the transmit/receive bit, which is used to set out two blocks for pointers associated with transmitting and receiving. For example, memory location 3C0 contains the pointers for the Transmit Vector Word command, memory location 3CI contains the pointer for a receive command associated with subaddress 01, etc. The transmit pointer block starts at location 3E0, which is reserved for transmitting the last command, followed at address 3El by the pointer for a transmit command associated with subaddress 01, etc.

For stores applications, it is expected that relatively few commands will be applicable. It is an advantageous feature of the invention that the system designer may subdivide the space as is preferred, assigning the same address to several commands that will not be used (which address may contain data that will flag an error to the 1553 bus controller, for example).

In addition to control lines to interface 222 that permit it to control RAM 230, the CPU can write directly to control register 256. This register is a means for the CPU to pass data onto the 1553 bus, make writing to selected bits in the control register causes corresponding bits in the status word (register 258) to be set. The status of the RTI chip, as opposed to the status of the total system, is indicated in system register 253, which the CPU can read but cannot write. The systems register contents are listed in Table I and the control register contents are in Table II.

As an application of user configuration, the system designer may find it convenient to segregate commands in two classes—one in which it is required that stored information be transmitted and another for commands that require in a significant length of time to execute.

The quick response commands may be stored in and operated from one area of memory and the other commands may be stored in a different area of memory. Thus, the local CPU can respond more quickly to commands requiring the transmission of existing information without interfering with the storage and allocation of commands that require a longer time to execute. If this were not so, the system could be hung-up until a slow command is completed.

Figure 4:
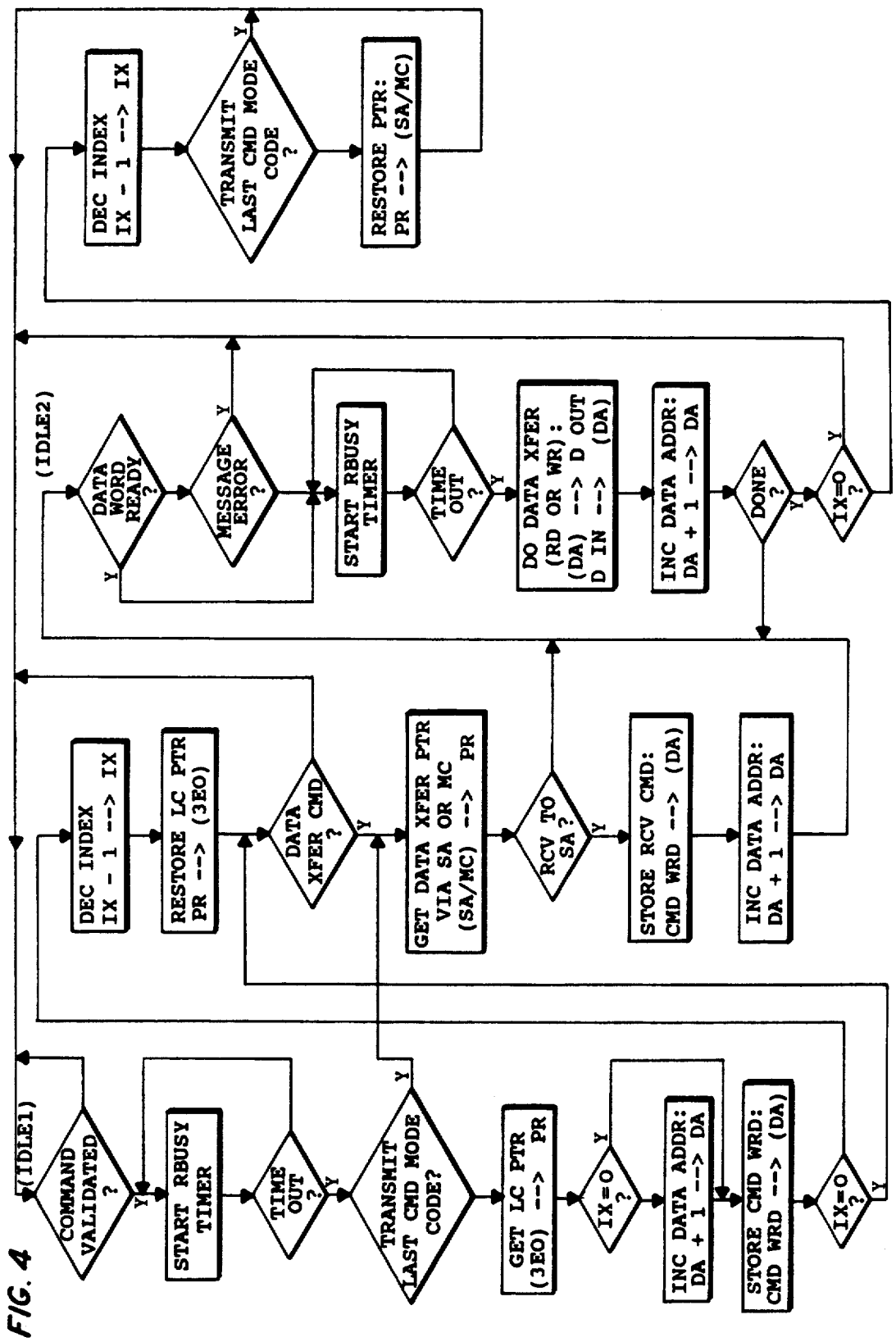
FIG. 4 is a flow chart of the RAM state machine.

Referring now to FIG. 4, there is shown a flow chart of the states of RAM state machine 220. Most time is spent in the idle 1 state at the upper left-hand corner of the Figure. If a command has been validated, execution of the sequence of steps begins; the RTS asserts RBUSY and starts the timer. When the time-out condition is complete and the chip is free, it proceeds to test for a particular command, the Transmit Last Command Mode Code. If so, it branches to another state which requires that the last command be sent back on the bus. If not, it proceeds on the main sequence. It fetches the pointer of the previous command from location 3E0 (in this example) to pointer register 238 and tests the index to the number of messages (the high order 6 bits). If there is room in the defined buffer block (IX≠0), then the data address field in the pointer register is incremented to the next address where the register contents will be stored.

The command word is then stored in RAM in the location indicated by the DA field in the pointer register so that the CPU will be able to keep a history of the commands that have been sent to it. If the index number is not zero, meaning that there is room for more data, the index is decremented and the new address location is stored in the data pointer reserved for that subaddress (3E0), indicating the location for the next command. If the command that was received is not a data transfer command, then the RTS has nothing further to do and goes back to the idle 1 state.

If it is a data transfer command, then it begins the sequence of removing the data from RAM or storing data to RAM and sending it on its path. The pointer to the data will have been decoded in either the SA or MC unit and be ready to be entered into the address location. If it is a receive command, then the command is stored as before in a different area of RAM pointed to by the pointer associated with the SA or MC and the data address for the command storage is incremented.

The state then advances to idle 2 where it is waiting for the next action on the bus. When the control section is ready to store a word taken off the 1553 bus, or to transmit a word on the bus then it sends a signal taking the state machine out of the idle 2 state.

When the data is available on-chip, the RBUSY signal is asserted and, after the time-out period, the data is transferred in or out. The state machine then loops back to the idle 2 state and this process is repeated until all the data is transferred.

There is then a clean up section in which the index is decremented to point to the next free word and the state machine checks to see if the present operation was the special transmit last command. If so, the machine reverts to idle 1 and if not, the contents of the pointer register are placed back in the pointer location for the appropriate subaddress.

It is the responsibility of the CPU to check the index and memory usage and alter the pointer. For example, if the pointer was initially 5 for the receive block and 5 messages have been received and stored, the RTS will continue to overwrite the most recent address until the CPU sets the index back to 5. The system designer must provide a routine to note what messages have been processed and may be overwritten and either to loop back and write over obsolete messages or to assert the busy bit in the status register to block the receipt of more messages until they can be handled.

Note that the index is not decremented and the pointer is not restored until the whole message is stored. This ensures that bad data will be overwritten, so that only good messages are in RAM. It is the responsibility of the bus controller to recognize the message error flag and to retransmit the data.

As can be seen from the above, the chip effectively carries out transmissions on or off the bus without intervention from the host, writing into memory or reading from it as required. This independence reduces the load on the host, permitting the use of a slower and cheaper CPU than would be practical if the host were required to intervene in the transfer process. In many cases the command will be transmission of status information which will already have been stored in RAM, so the host need not be interrogated. If the command is different, requiring storage of a command word or data which will be picked up and acted on by the host later, then the interface chip merely stores the data in RAM and signals the host that a command has been processed. The host then, at its convenience, accesses the message and carries out whatever the command may require.

Those skilled in the art will appreciate the flexibility afforded to the system's designer by this circuit. The functions required of stores vary greatly. In many cases, the electronics on the store will transmit status information back to the system and nothing more. Examples of status information may be self-test results, battery voltage levels and the like. In that case then, the area allocated for transmit messages will be small compared to the buffer required for messages from the system to the store. In other cases, such as those in which a radar pod or other complicated device is connected as a store, the local CPU may have to receive data such as velocity or location from the host and then act on that data and produce data in return. In that case, a greater area would be reserved for the transmit storage. Similarly, the storage area may be divided into portions which will require only a short response by the host and may be answered quickly and those which involve mechanical motion and the like and which must remain for a longer period of time. If these commands were mixed together, then the memory could not be reused or overwritten.

A feature of the invention is that the memory is pseudo dual port, rather than true dual port. It is therefore necessary to resolve contention between the controller and the CPU for memory access. Ordinarily, the controller would signal a bus request and then wait for permission from the bus master (CPU). In this case a simple method is employed, in which the CPU ordinarily has complete control over memory. When the controller needs to access memory, it asserts RBUSY, waits a fixed time, either 2.7 or 5.7 microseconds, and proceeds to access the memory. It is the responsibility of the system designer to structure the CPU processing so that it may get out of memory when required, without violating the integrity of data that is in the process of being stored in memory. One method is to reserve a portion of RAM for data stored from the CPU (in the section for data to be transmitted). The controller may read from this section, but not write to it. Thus, if the CPU is interrupted, it can simply resume its task without worrying about the data already stored having been spoiled Another feature of the invention is the provision for a continuous self-test mode, in which data transmitted off the bus through multiplexer 112 is read in through input 110 (as the signals are reflected off the coupling transformer) and fed by multiplexer 120 to comparator 272. Thus, the transmissions may be monitored continuously.

Another feature of the invention is a mode in which the system checks on messages passed from another remote terminal (RT) to itself. As the system monitors the 1553 bus, it watches for an RT to RT command from the bus master that will direct data to it. When such a command is detected, it stores the address of the transmitting RT. When the message is received, it compares the incoming status word's terminal address with the previously stored address. A mismatch causes the message error bit in the status word of the receiving RT to be set.

It should be understood that the invention is not limited to the particular embodiments shown and described herein, but that various changes and modifications may be made without departing from the spirit and scope of this novel concept as defined by the following claims.

TABLE I

| BIT | NAME (INITIALIZED STATE) | MEANING |
|---|---|---|
| 15 (msb) | TERMINAL ACTIVE | [0] A logic 1 whenever the device is executing a transmit or receive operation |
| 14 | VALID MESSAGE | [0] A logic 1 indicates that a valid message has been received since the last system register read. This bit is not reset until the register has been examined. |
| 13 | MESSAGE ERROR | [0] A logic 1 indicates that a message error has occurred since the last system register read. This bit is not until the register has been examined. |
| 12 | TA PARITY ERROR | [0] A logic 1 indicates wrong terminal address parity causing the biphase inputs to be disabled. |
| 11 | SELF TEST | [0] A logic 1 indicates that the chip is in internal self-test mode. This bit will be reset when self-test is terminated. |
| 10 | BUSY | [1] A logic 1 while the processor is busy. This bit is reset when the system busy is reset in the control register. |
| 9 | TERMINAL FLAG ENABLED | [1] A logic 1 indicates that the Bus Controller has not issued an Inhibit Terminal Flag mode code. A logic 0 indicates that the Bus Controller, via the above mode code, is overriding the host system's ability to set the terminal flag bit of the status word. |
| 8 | CHANNEL A ENABLED | [1] A logic 1 indicates that channel A is available for both reception and transmission. |
| 7 | CHANNEL B ENABLED | [1] A logic 1 indicates that channel B is available for both reception and transmission. |
| 6 | CHANNEL A/B | [1] A logic 1 indicates that the most recent command arrived on channel A; a logic 0 indicates that it arrived on channel B. |
| 5 | SA/MC | [0] A logic 1 indicates that bits 4 through 0 are subaddress indicated in the last command word and that the last command word was a normal transmit or receive command. A logic 0 indicates that the bits 4 through 0 are in a mode command. |
| 4 | MCSA4 | [0] Mode code or subaddress as indicated by the logic state of bit 5. |
| 3 | . | . |
| 2 | . | . |
| 1 | . | . |
| 0 (lsb) | MCSA0 | [0] |

TABLE II

| BIT | NAME (INITIALIZED STATE) | MEANING |
|---|---|---|
| 12 (msb) | RBUSY TIME SELECT | [1] A logic 1 selects 5.7 RBUSY, a logic 0 selects 2.7 RBUSY |
| 11 | PIN SELECT | [1] A logic 1 selects disconnect function, a logic 0 selects terminal active function. |
| 10 | NOTICE | [1] A logic 1 enable notice III, a logic 0 enable notice I and II. |
| 9 | BROADCAST ENABLE | [1] A logic 1 enable the RTSI to recognize broadcast commands |
| 8 | INSTRUMENTATION | [0] A logic 1 sets the instrumentation bit of the status register. |
| 7 | SERVICE REQUEST | [0] A logic 1 sets the service request bit of the status register. |
| 6 | SELF-TEST ENABLE | [0] A logic 1 puts the RTSI in internal self-test mode and inhibits normal operation. |
| 5 | SELF-TEST CHANNEL SELECT | [0] Selects which channel is tested in self-test mode; a logic 1 selects channel A and a logic 0 selects channel B |
| 4 | SUBSYSTEM FLAG | [0] A logic 1 sets the subsystem flag bit of the status register. |
| 3 | SYSTEM BUSY | [1] A logic 1 sets the busy bit of the status register and inhibits RTSI memory accesses. |
| 2 | TERMINAL FLAG | [0] A logic 1 sets the terminal flag bit of the status register. |

TABLE II-continued

| BIT | NAME (INITIALIZED STATE) | MEANING |
| --- | --- | --- |
| 1 | CHANNEL B ENABLE | [1] A logic 1 enables channel B biphase inputs. |
| 0 (lsb) | CHANNEL A ENABLE | [1] A logic 1 enables channel A biphase inputs. |

What is claimed is:

1. An integrated circuit system comprising at least one integrated circuit for interfacing between a serial bus and a CPU and comprising:
   an input-output section connected to said serial bus and comprising decoding means for decoding bus commands;
   chip control means, responsive to said decoding means, for controlling various components of said integrated circuit;
   memory control means, connected to said chip control means, for controlling memory addresses in an integrated circuit memory, and;
   host interface means for passing signals to and from said CPU connected to said integrated circuit system, characterized in that:
   said memory control means controls an on-chip two-input memory located on the same chip as said chip and memory control means and controls the flow of memory addresses along a first path extending from said host interface means to said memory and along a second path extending from said input-output section through command decoding means and pointer assignment means to an address port on said on-chip memory;
   said chip control means controls a set of data paths having a first branch extending from said host interface means through a first set of controllable devices to a data input port in said on-chip memory, a second branch extending from said input-output section through a set of controllable devices to said data input port, a third branch extending from a data output port in said on-chip memory to an output encoder and thereafter to output bus interface means external to said integrated circuit, a fourth branch extending from said data output port to said host interface means, and a fifth branch extending from said data output port through at least one controllable device to said address port, whereby output data may be converted to an address;
   a set of control lines extend from said CPU to CPU interface command means in said integrated circuit for control by said CPU of read and write operations between said CPU and said on-chip memory;
   said memory comprises a pointer section containing up to a predetermined number of address pointers for indicating the location of data blocks within a receive storage section of memory for the storage of messages received from said serial bus and for indicating the location of blocks within a transmit storage section of memory for the storage of messages to be sent onto said serial bus, both of said storage sections being subdividable by pointer assignment into a set of at least two storage subsections, whereby said memory is configurable by said CPU through pointer assignment;
   said integrated circuit further includes assignment means responsive to a serial bus command, for assigning a pointer to serial bus data to be stored in said memory, whereby data may be selectively stored in one of said storage subsections.

2. A system according to claim 1, further characterized in that said chip control means and said memory control means are responsive to signals from said CPU to control access to said on-chip memory for read and write operations, whereby said on-chip memory operates under control of said CPU; and
   said integrated circuit further includes contention means responsive to a command from said serial bus and connected to a memory assertion line extending from said integrated circuit to said CPU for sending a command to said CPU to cease operating on said on-chip memory by a predetermined delay time and means for accessing said on-chip memory after said predetermined delay time, whereby said CPU has control of said memory, subject to overriding control by said integrated circuit, so that said integrated circuit may assert control over said on-chip memory and force said CPU to cease a memory operation in response to a command received on said serial bus.

3. A system according to claim 2, further characterized in that said chip control means and said memory control means cooperate in a state-machine sequence of operations in an independent mode to respond to commands received from a bus master on said serial bus to access said on-chip memory in read and write operations without intervention by said CPU.

4. A system according to claim 2, further characterized in that said assignment means includes means for assigning pointers to data associated with a first set of serial bus commands in a first block of said on-chip memory and pointers to data associated with a second set of serial bus commands in a second block of said on-chip memory, whereby said CPU may operate on data in said first and second blocks and write data associated with a pointer to one of said first and second blocks without interference in memory allocation between said first and second sets of bus commands.

5. A system according to claim 4, further characterized in that said first and second sets of serial bus commands are receive commands, for which said integrated circuit stores data in two separate memory blocks.

6. A system according to claim 2, further characterized in that said memory control means includes means for incrementing the value of said pointer to write data blocks sequentially in said receive storage location of memory up to a predetermined index number of data blocks, whereby said integrated circuit may receive and store up to said predetermined index number of data blocks without intervention from said CPU.

7. A system according to claim 6, further characterized in that said pointer comprises a first field containing a memory address and a second field containing a data block index number, whereby said pointer points to the next memory address to be accessed and also indicates the remaining space available within said receive storage location.

8. A system according to claim 7, further characterized in that said means for incrementing the value of said pointer and a means for modifying said data block index number are combined with pointer register means connected to said data output port and having means for incrementing an address field of a predetermined number of bits within said pointer register and means for modifying an index field of a predetermined number of bits within said pointer register, and in that said pointer register further includes means for loading said address field onto a bus connected to said address port, whereby data in a memory location containing a pointer value may be written into said pointer register and the address field thereof incremented and loaded into said address port to specify the address of a predetermined data word to be read from or written into said on-chip memory.

9. A system according to claim 1, further characterized in that said integrated circuit further includes comparison means connected to said input/output section for comparing data transmitted on said serial bus from said integrated circuits with an incoming echo signal present on input terminals of said integrated circuit and comprising a reflected signal of said data reflected by said output bus interface means, whereby said integrated circuit checks said input/output section.

10. A system according to claim 2, further characterized in that said integrated circuit further includes comparison means connected to said input/output section for comparing data transmitted on said bus from said integrated circuit with an incoming echo signal present on input terminals of said integrated circuit and comprising a reflected signal of said data reflected by said output bus interface means, whereby said integrated circuit checks said input/output section.

* * * * *